Patented Oct. 22, 1940

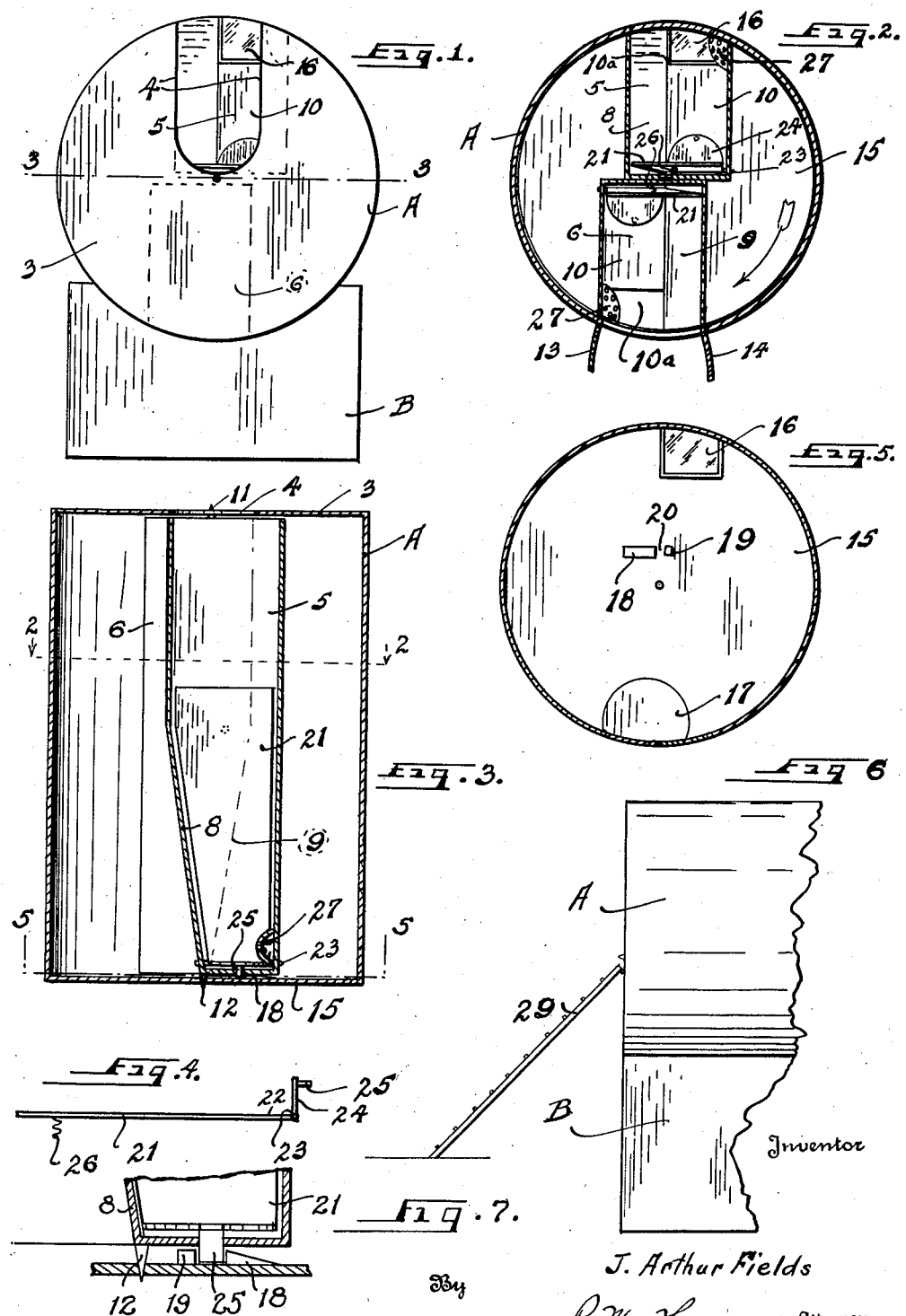

2,218,746

UNITED STATES PATENT OFFICE 2,218,746

ANIMAL TRAP

J Arthur Fields, Ophir, Utah

Application September 27, 1937, Serial No. 165,809

3 Claims. (Cl. 43—72)

My invention relates to traps and has for its object to provide a new and efficient trap for small animals such as rats, mice, muskrats, etc., which trap may be used in two distinct ways, mainly to trap the animals alive or to kill them after trapping them.

A further object is to provide a trap for animals which may be made in different sizes and which is self actuated using the weight of the animal to trip and rotate the trap cylinder to catch the animal.

A still further object is to provide a highly efficient economically manufactured trap which will be positive in its action and which if desired will catch the animal or varmint without any harmful results.

A still further object is to provide a self setting trap in which one animal when caught sets the trap for the next animal.

These objects I accomplish with the device illustrated in the accompanying drawing in which similar numerals and letters of reference indicate like parts throughout the several views and as described in the specification forming a part of this application and pointed out in the appended claims.

In the drawing in which I have shown my device

Figure 1 is a front elevation of the trap set ready for catching the animal.

Figure 2 is a vertical transverse section on line 2—2 of Figure 3 showing the trap tumblers in the cylinder.

Figure 3 is a longitudinal section of the trap taken through one of the trap tumblers or animal compartments.

Figure 4 is a side elevation of the tripping or release treadle for the trap tumblers.

Figure 5 is a section transversely of the cylinder with the animal tumblers or compartments removed.

Figure 6 is a side elevation of one end of the trap showing a means of the animal ascending to the animal compartment.

Figure 7 is an enlarged view of the locking mechanism used to hold the body from rotation until actuated by the body weight of an animal.

In the drawing I have shown the trap as made of a horizontally mounted cylinder A, carrying opposed identical eccentric animal tumbler compartments 5 and 6 therein, said compartments being made in an integral body and adapted to rotate within the cylinder A. The two tumbler compartments are made identical, with each mounted with the center of gravity to the right of the pivotal point thereof which is on the axis of the cylinder A, when one of the tumblers is in the uppermost position so that the position of the tumbler compartments is opposed to each other and when looking at the end of them the one which in Figure 2, being 5 is at the right of the axis of the cylinder and the tumbler 6 is at the left of the axis but, when they are rotated they trade positions, or rotate one half turn. Each of the compartments has a portion of one side tapered off to insure that the weight of the animal being caught will cause the tumblers to rotate and this is done by slanting the walls 8 and 9 of the two compartments toward the end 10. This is the closed end of the compartments.

The two tumblers being secured together by spot welding, riveting, or other suitable means, and when so secured they are pivoted in the cylinder A on the pivot pins or shafts 11 and 12. The bottom of the cylinder A under that position of the lowermost of the two tumblers is provided with hinged gates 13 and 14 to allow the trapped animal to fall into a suitable container.

As shown in Figure 1 the container B is mounted under the cylinder A and will hold the trapped animal, however this chamber B may be larger, or may be filled with a poison or liquid to kill the animal if and when desired. The end 15 of the cylinder A is closed except that in some instances a small plate of glass 16 may be mounted therein in alignment with the uppermost tumbler as some animals will not enter a trap of this type unless they can see out the other side or there is light in the trap. Also an end discharge may be made if desired in the lower side of the cylinder A as shown in Figure 5 at 17. The entrance to the tumbler compartments 5 and 6 is through the end 3 of the cylinder through the opening 4 therein to permit the animal to enter the trap tumblers.

As a means to hold the tumblers in ready position I provide a locking lug 19 on the inside of the end 15 of the cylinder with a wedge-shaped incline 18 leading to the lug with a space 20 between the incline and lug. To lock the tumblers and as a means of tripping them when the animal is therein there is a flat trigger plate 21 pivotally supported at the end 22 by pins 23 and the trigger plate is held in slightly elevated position by the spring 26 under the free end thereof. The hinged end of the plate is provided with a right angled end 24 carrying a trigger pin 25 with the pin 25 passing out through a hole in the end of the compartmenmt. This pin 25 extends a sufficient distance through the end of the tumbler to engage in that space between the incline 18 and lug 19 to act as the locking means for the rotary portion of the trap. The incline 18 is provided so that when the tumblers are rotated the trigger pin 15 will pass over the incline and engage between the end of the incline and the lug 19 to lock the tumblers in relation to the cylinder A. With each half rotation of the tumbler compartments, one or the other of the two pins 25 will pass over the incline 18 into the space 20 between the incline and lug 19 to lock the trap until another animal has entered the compartment and stepped on the trigger plate at which time the pin 25 will be withdrawn from the space 20 and the weight of the animal will cause the tumblers to rotate leaving the animal in the lower compartment from which he falls into the base B, and setting the next tumbler compartment ready for another animal. Each compartment is provided with a bait screen or pocket 27 in which compressed bait may be placed when needed.

The top section 10a of the ends 10 or each tumbler compartment is cut away so that the animal can see out of the glass plate or may crawl out of the opening 17 should this type of discharge be used.

As shown in Figure 6 a ramp 29 may be provided for small animals to enter the tumbler compartments if desired.

Having thus described my invention, I desire to secure by Letters Patent and claim:

1. In a trap, the combination of a cylindrical body; a pair of tumbler bodies mounted in said cylindrical body, each being mounted with its center at one side of the central axis of the cylindrical body to permit the weight of the animal to rotate the tumblers; and means to lock and release the tumbler bodies after each animal has been caught.

2. In a trap of the class described, the combination of a cylindrical body having an opening in the upper portion of one end and a discharge opening through the bottom side; a pair of tumbler compartments mounted off center and to rotate in said cylindrical body by the weight of the animal when he enters the compartment; means to lock said compartments with one compartment in alignment with the opening in the end of the cylindrical body; and trigger means to release said locking means to allow said tumblers to rotate one half turn when an animal has entered the upper compartment.

3. In a trap of the class described, the combination of a cylindrical body having an opening in the upper portion of one end thereof and with a small opening near the top side of the other end, said opening carrying a transparent closure therein; a pair of opposed compartments mounted in said cylindrical body with each compartment spaced at one side of the central axis so that a body in one compartment will cause the two compartments to rotate; a trigger plate mounted in the bottom of each compartment having a small trigger extended out one end; and means to lock the trigger end and thereby the compartments from rotating until a weighted body rests upon the plate withdrawing the trigger.

J ARTHUR FIELDS.